(12) United States Patent
Ramadas

(10) Patent No.: US 8,108,457 B2
(45) Date of Patent: *Jan. 31, 2012

(54) METHODS AND APPARATUS TO ENHANCE THE PERFORMANCE OF WEB BROWSERS OVER BANDWIDTH CONSTRAINED LINKS

(75) Inventor: Krishna Ramadas, Cupertino, CA (US)

(73) Assignee: Venturi Wireless, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/207,226

(22) Filed: Aug. 10, 2011

(65) Prior Publication Data

US 2011/0302233 A1    Dec. 8, 2011

Related U.S. Application Data

(63) Continuation of application No. 12/940,376, filed on Nov. 5, 2010, now Pat. No. 8,010,693, which is a continuation of application No. 12/749,305, filed on Mar. 29, 2010, now Pat. No. 7,860,998, which is a continuation of application No. 11/122,868, filed on May 4, 2005, now Pat. No. 7,694,008.

(51) Int. Cl.
*G06F 15/16*    (2006.01)

(52) U.S. Cl. ........ 709/202; 709/223; 711/137; 718/101; 725/51

(58) Field of Classification Search ........... 709/232, 709/223; 711/137; 725/51
See application file for complete search history.

(56) References Cited

U.S. PATENT DOCUMENTS

| | | | |
|---|---|---|---|
| 6,813,767 B1 * | 11/2004 | Willke | 718/101 |
| 6,990,678 B2 * | 1/2006 | Zigmond | 725/51 |
| 7,089,367 B1 * | 8/2006 | Koker et al. | 711/137 |

* cited by examiner

*Primary Examiner* — Tammy Nguyen
(74) *Attorney, Agent, or Firm* — Michael A. Glenn; Glenn Patent Group

(57) ABSTRACT

Increasing the performance of a browser while operating over bandwidth constrained links by pre-fetching of web objects to increase the level of concurrency. Using an agent or a gateway to speed up its Internet transactions over bandwidth constrained connections to source servers. Assisting a browser in determining the order of fetching objects in such a way that an object is ready and available locally before the browser requires it. Providing seemingly instantaneous availability of objects to a browser enabling it to complete processing the object to request the next object without much wait.

18 Claims, 3 Drawing Sheets

METHODS AND APPARATUS TO ENHANCE THE PERFORMANCE OF WEB BROWSERS OVER BANDWIDTH CONSTRAINED LINKS

CROSS REFERENCE TO RELATED APPLICATIONS

This patent application is a continuation of U.S. patent application Ser. No. 12/940,376, filed Nov. 5, 2010, now U.S. Pat. No. 8,010,693 which is currently allowed, which is a continuation of U.S. patent application Ser. No. 12/749,305, filed Mar. 29, 2010, which is now U.S. Pat. No. 7,860,998, which is a continuation of U.S. patent application Ser. No. 11/122,868, which is now U.S. Pat. No. 7,694,008, filed May 4, 2005 and granted Apr. 6, 2010, each of which is incorporated in their entirety herein by this reference thereto.

BACKGROUND OF THE INVENTION

1. Technical Field

The invention relates to improvements in the performance of computer networks. More particularly, the invention relates to increasing performance of HTTP over long-latency links by pre-fetching objects concurrently via aggregated and flow-controlled channels.

2. Description of the Prior Art

Internet Web pages embed many types of URLs and objects. Standard browsers that display Internet Web pages can fetch some of these objects in parallel from their Web server repository. Schemes that use a browser's capability to fetch objects in parallel reduce the time taken by a browser to display pages that have many embedded objects. However, the degree of parallelism is limited due to backward compatibility, effectiveness of TCP flow control, and simplicity of browser implementation when downloading certain types of objects, such as JavaScripts and StyleSheets. The currently well-known Web browsers always download JavaScripts in sequence and StyleSheets in a separate phase.

The sequential fetching of objects degrades the end user experience with such URLs in high latency and low bandwidth networks, such as radio access networks. In short, servers are waiting for new requests to arrive but clients do not issue them until previous corresponding responses are received. This causes the link to be under used.

A general purpose cache on a browser is used to improve the time taken to revisit the same Web page. However, the general purpose cache does not help the first visit to a Web page over a wireless link. Also, a subsequent revisit may not be of benefit if the browser has cleared parts of its cache to accommodate objects from subsequent fetches from other Web sites. Thus, the use of a general purpose cache does not provide a consistent and predictable improvement in performance.

The HTTP 1.1 Request Pipelining standard (RFC 2616) allows the degree of concurrency to be increased if it is properly employed when both ends support it. However, modern browsers do not use it in an optimal fashion for many reasons, such as backward compatibility, simplicity of implementation, and effectiveness of flow control. Thus, the standard does not change the browser behavior, and therefore fails to optimize the link use at all times.

It would be advantageous to provide a method and apparatus that mitigates the negative impact of sequential access in low bandwidth and high delay networks without altering browser behaviors.

SUMMARY OF THE INVENTION

The invention mitigates the negative impact of sequential access in low bandwidth and high delay networks without altering browser behaviors. This is achieved by increasing the degree of parallelism over the long-latency link by imposing a different downloading strategy, i.e. pre-fetch, from an agent to a gateway server. The issue of low degrees of parallelism is localized between the browser and the agent where there is virtually no latency and bandwidth limitation for HTTP transactions. The issue, therefore, is alleviated.

In one embodiment, the invention comprises a piece of software (client) that communicates with corresponding server software which readies the necessary object to be available on the platform hosting the browser. Low utilization over long-latency links occurs when browsers try to download objects from source Web servers in sequence or in a degree of concurrency that is less-than-optimal. This contributes to a major latency experienced by the end user. This latency can be greatly reduced by using the pre-fetching mechanism of this invention. Thus, the invention increases performance of HTTP over long-latency links by pre-fetching objects concurrently via aggregated and flow-controlled channels. The agent and gateway together assist a Web browser in fetching HTTP contents faster from Internet Web sites over long-latency data links. The gateway and the agent coordinate the fetching of selective embedded objects in such a way that an object is ready and available on a host platform before the resident browser requires it. The seemingly instantaneous availability of objects to a browser enables it to complete processing the object to request the next object without much wait. Without this instantaneous availability of an embedded object, a browser waits for its request and the corresponding response to traverse a long delay link. The invention is not limited to cache history on a browser. It actively performs selective fetch from the gateway server in a highly concurrent fashion, prior to the browser requesting a particular object. It does not require any support from Web browsers and end source servers. It also does not introduce any flow control issue under the high degree of parallelism. Thus, the invention improves HTTP performance of client-server implementations, especially with Web sites that use many JavaScripts and Style Sheets.

DETAILED DESCRIPTION OF THE INVENTION

Definitions

HTTP: Hyper Text Transfer Protocol—a TCP/IP based protocol to transfer Web pages, documents, etc. over the Internet.

HTML: Hyper Text Markup Language.

API: Application Programming Interface.

VTP: A Transport Protocol.

XML: Extension Hyper Text Markup Language.

As of today, publicly available HTTP browsers open a limited number of concurrent TCP connections to Web servers due to the decreased flow control effect as the number of TCP connections increase. This limits the degree of concurrency for the downloading of page objects. The HTTP1.1 Pipelining standard supra. tries to solve this problem by allowing the sending out of multiple requests through the same TCP connection before their responses are received. However, due to backward compatibility and the limitations of browsers and servers, the degree of concurrency is often low.

In addition, several types of objects, such as JavaScripts and Cascading Style Sheets, are often downloaded sequentially by browsers due to implementation simplicity. This further decrease the degree of concurrency, and therefore, the use of the long-latency link, due to the time spent on waiting for responses.

The preferred embodiment of the invention comprises an agent and gateway system that, by using an independent flow control mechanism (VTP), is not concerned by the number of TCP connections virtually opened between the browser host platform and the source Web (or proxy) server, and that is therefore useful for downloading objects in parallel. By using a cache on the client side, Web objects can be downloaded in parallel as soon as the agent is aware of them, independent from the implementation of end browsers and source Web servers.

Figure 1:
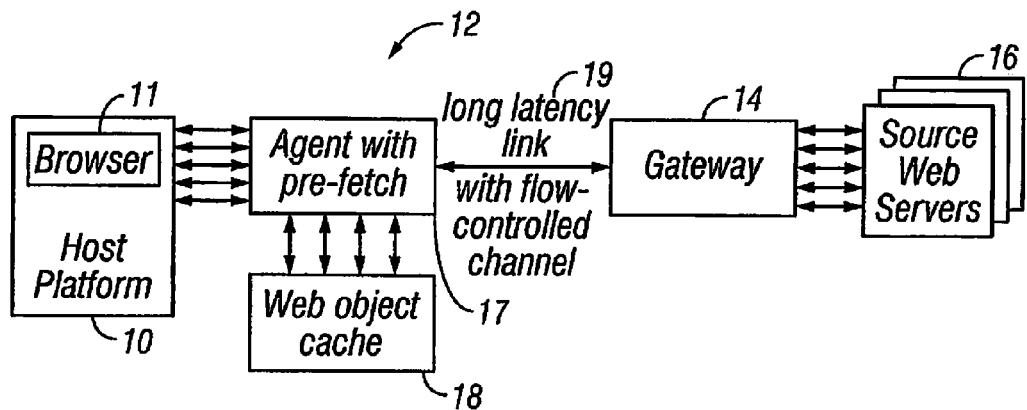
FIG. 1 is a block schematic diagram of a system architecture implementing a method and apparatus for increasing performance of HTTP over long-latency links according to the invention.

FIG. 1 is a block schematic diagram of a system architecture implementing a method and apparatus for increasing performance of HTTP over long-latency links according to the invention. There are four major entities in the preferred system: a browser 11, typically within a host platform 10; a client 12, comprising an agent with pre-fetch functionality 17 and a Web object cache 13; a server 14, in communication with said client via a long latency link having a flow controlled channel 19; and an original Web server 16 which is in communication with said server 14. In the prior art, a browser request is translated into signal messages and flow control under a transport protocol (VTP) and routed to the server. The server translates the request back to an original, regular HTTP request to the original Web server, and the response travels back to the server. Then it is processed, either compressed using lossy or non-lossy techniques as are known in the art, and transferred through the VTP again back to the client. The client provides a compressed message back to the browser. The preferred embodiment uses a UDP-based, VTP flow control and transport protocol, discussed below (see, also, U.S. Pat. No. 6,529,516 and U.S. Pat. No. 6,115,384, which are incorporated herein in their entirety by this reference thereto).

Where the degree of parallelism is low and the number of requests is low, the invention identifies the fact that many browsers branch JavaScripts and Style Sheets in a sequential manner, rather than in parallel. Thus, the invention explicitly pre-fetches this type of object, with dramatically improved overall performance.

For example, a Web page may have several JavaScripts and Style Sheets and many GIFs. These are some of the components of a Web page, and they are used for rendering the Web page. The Web page may also comprise additional HTML, JPEGs, and FLASH, etc.

The inventors have identified two objects, i.e. JavaScripts and Style Sheets, as major factors that slow the system down, although the invention is not limited to the pre-fetching of just these objects. A browser may already perform some parallel fetching, but JavaScripts and Style Sheets are not typically fetched, nor is any effort made to discriminate in the type of object that is being fetched. By selectively pre-fetching these certain objects, such as these types of objects, the system's performance is dramatically improved. Thus, the preferred embodiment implements client-side selective pre-fetching which, in the presently preferred embodiment, comprises JavaScript and Style Sheet pre-fetching.

The invention preferably comprises pre-fetcher 17 and a cache 18 components, the latter of which is introduced in the client part of the system. To pre-fetch, the system also comprises a parser, a pre-fetch handler, and a storage system to keep the pre-fetched objects (discussed below in greater detail).

In operation, the browser requests an object. The object is sent back through the server to the client. If the object is a description of a Webpage e.g. HTML the client parses it for the agent and determines that the Web page has certain components in it. In the preferred embodiment, the parser determines if there are any JavaScripts or Style Sheets, for example, in the Web page. If there are, rather than waiting for those objects to be requested by the user's browser, those objects are obtained from the Web server by the agent. Thus, when a Web page comes back to the user, the Web page goes back to the browser, and concurrently the page does not pause while the JavaScript is fetched.

The Web page is a description object. It specifies component objects. Main page is always the first object that comes back, and it describes what is needed to render a page. Most of the time, the browser fetches JavaScript and Style Sheet objects one at a time. Every time such an object is fetched, the user must wait for a time delay. The inventors have observed that the browser does not do the same thing for the other type of objects, such as GIFs, JPEGs, or FLASH. The typical browser fetches other types of objects in parallel, at least to a certain degree, and somehow only fetches certain types of objects one at a time.

The browser parses the page description, and while the page description is operated upon by the browser, the parsing element is also parsing the page description to identify Java-Scripts and Style Sheets. These particular objects are of a type that are normally sequentially fetched. The pre-fetch mechanism is used concurrently with the browser to go to the original Web server to fetch these objects while the browser is still loading the page. The system fetches these objects and brings them over to the cache, so that these objects are now resident at the cache. As a result, rather than have to go out across the system with its concomitant latency, to get these objects to complete the building of the Web page sequentially, it is only necessary access the client locally to complete loading the Web page. This speeds the system up considerably. Thus, the invention uses parallelism and selective pre-fetching to give the impression of reduced round trip.

Functional Specification

Problem Definition

In current client architectures, HTML pages are fetched when requested by the browser. In certain situations, the browser requests pages, such as JavaScripts, sequentially. Sequential requests do not maximize VTP as there is no parallelism. To maximize VTP, pre-fetch on the client is required.

Assumptions

Implementation of the invention assumes that the browser performs HTML requests sequentially for certain files, such as JavaScripts.

Requirements

The invention implements a client pre-fetch feature with the following requirements:

Properties configurable via XML:
HTML page priority based on browser request
Non-persistence over different running session
Perform HTML file pre-fetch Functionality The following functional components are required: post HTML processing, client side pre-fetch control, and file cache.

The post HTML processing module is for parsing an HTML page to retrieve a list of URLs to pre-fetch, regardless of their file extension. This list of URLs is fed into the client pre-fetch control module.

The client side pre-fetch control module performs HTTP requests for identified objects.

The file cache handles caching pre-fetch file locally on persistence storage.

Usability

The invention is preferably implemented with a provision for end users to enable or disable file fetch. For this feature, the GUI presents an option to either enable or disable this feature. On a disable, the local cached file, as well as internal pre-fetch record, is cleared.

Design Specification

This discussion provides details of the design for the post HTML processing, client pre-fetch control, and file cache modules.

Overview

Figure 2:
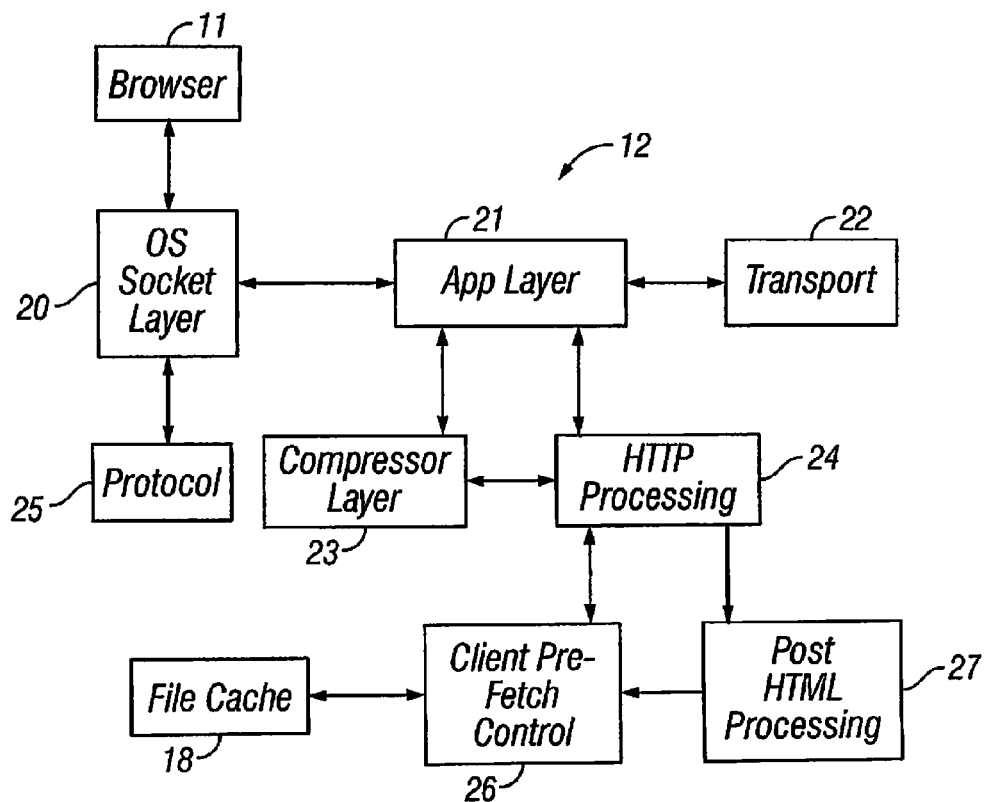
FIG. 2 is a block schematic diagram that shows an overview of the modules interaction according to the invention.

FIG. 2 is a block schematic diagram that shows an overview of the modules interaction. In FIG. 2, the browser 11 interacts through the OS socket layer 20 with protocol 25." The OS socket layer 20 interacts with an application layer 21 that, in turn, interacts with a compressor layer 23 and a transport mechanism 22. An HTTP processing module 24 is the key to operation of the invention and, in addition to the application layer 21 and compressor layer 23, interacts with a post HTML processing module 27 and the client pre-fetch control module 26, which itself interacts with the file cache control 18.

Module Design

The following discussion describes the module design for each subsystem, i.e. post HTML processing, client pre-fetch control, and file cache. In each of FIGS. 3-5, discussed below, operational flow is indicated by a numeral and an asterisk, e.g. "1*."

Figure 3:
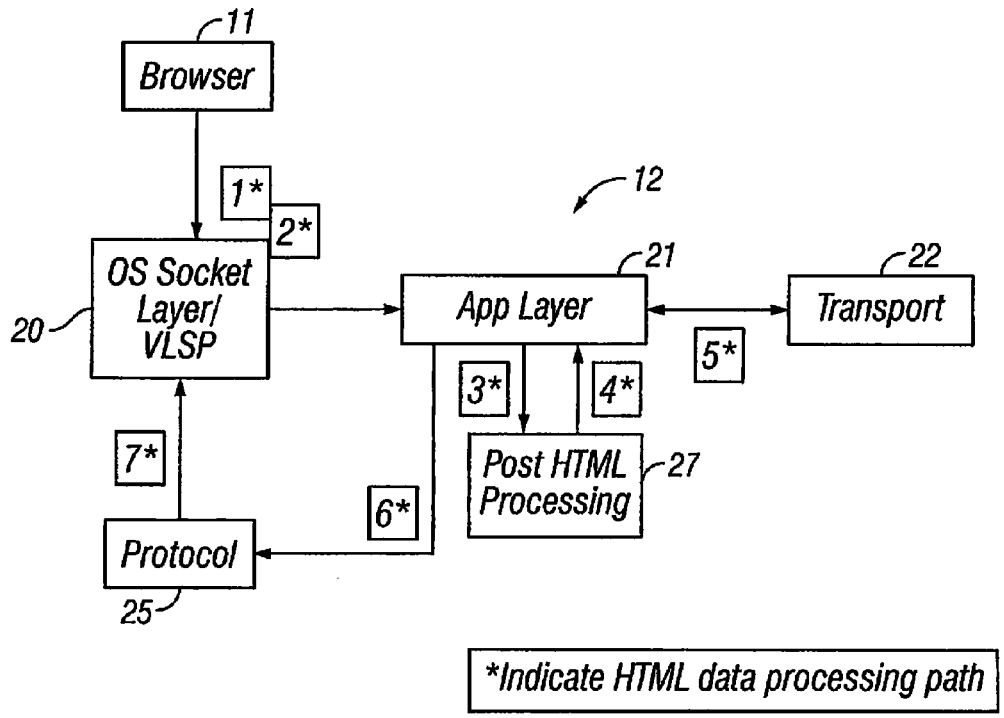
FIG. 3 is a flow diagram that shows connection flow via the local cache according to the invention.

FIG. 3 is a flow diagram that shows connection flow via the local cache. When the user accesses the browser to view a Web page 1*, the OS socket layer/VLSP in turn communicates with the application layer 2*. The post HTML processing module is accessed 3* and returns an output to the application layer 4*. The application then accesses the transport module 5*, which fetches a Web page, and the file cache module 6*, which returns a Web page to the OS socket layer/VLSP 7*.

Figure 4:
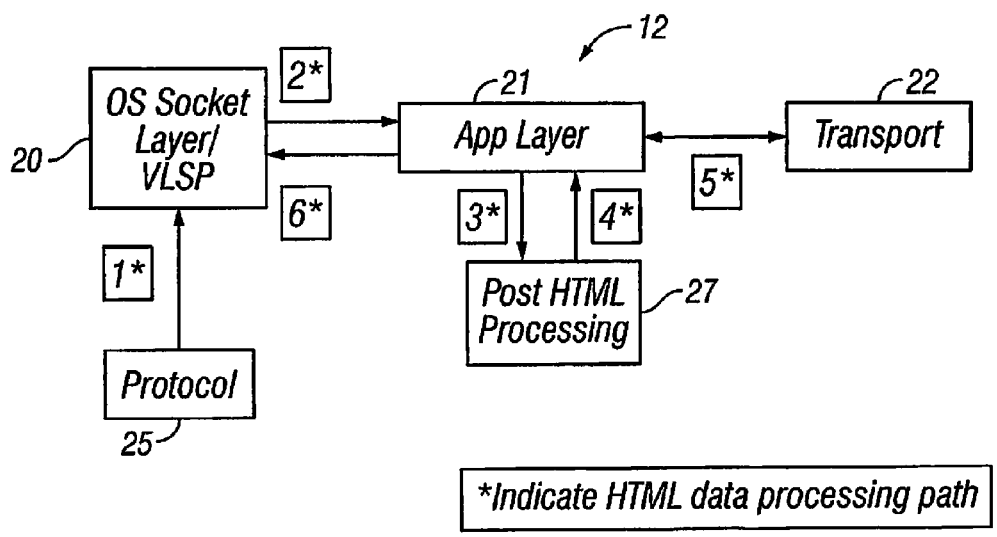
FIG. 4 is a flow diagram that shows connection flow from the local cache according to the invention.

FIG. 4 is a flow diagram that shows connection flow from the local cache. When the protocol module is active it accesses the OS socket layer/VLSP 1* which, in turn accesses the application layer 2*. The application layer interacts with the post HTML processing module 3*, 4*, and the application layer then uses the transport module 5*, after which it provides cache contents to the OS socket layer/VLSP 6*.

Figure 5:
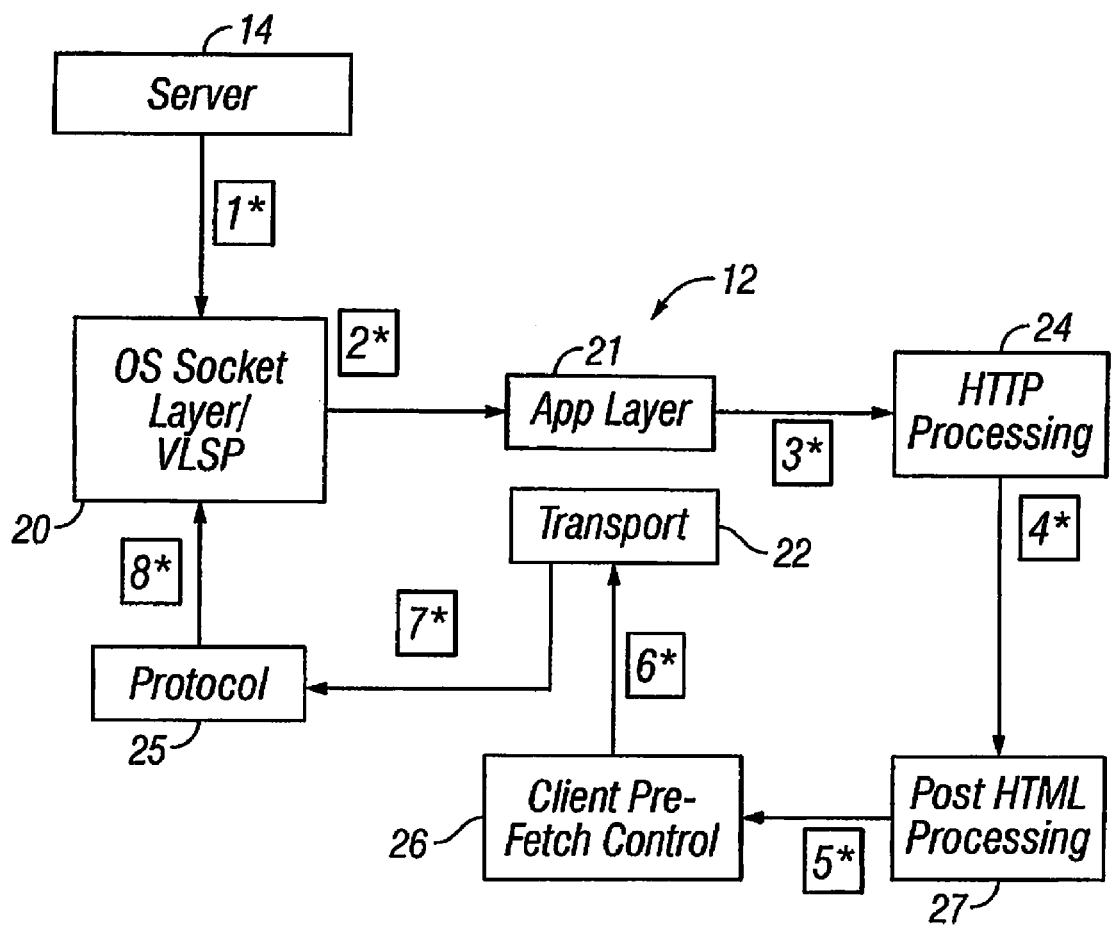
FIG. 5 is a block schematic diagram that shows a pre-fetch post HTML processing connection according to the invention.

FIG. 5 is a block schematic diagram that shows a pre-fetch post HTML processing connection. Here, the server accesses the OS socket layer. VLSP 1*which, in turn, communicates with the application layer 2* and, thence, the HTTP processing module 3*. Flow proceeds to the post HTML processing module 4*, which interacts with the client pre-fetch control module 5*. The client pre-fetch control module interacts with the transport module 6* which, in turn, communicates with the protocol module 7*. The protocol module returns requested results to the OS socket layer/VLSP 8*.

Post HTML Processing Module Design

The post HTML processing module produces a list of URLs to pre-fetch. Each URL is fed into the client pre-fetch control module.

Client Prefetch Control Module Design

The client prefetch control module contains the decision logic to determine whether and when to fetch a page. Pre-Fetch URL is stored in a index linked list structure. Once it determines that an URL should be pre-fetched, it establishes a bypass connection to the local cache module. The cache address and port number is determined by querying the local cache module. When the connection is established and it receives data from the local cache, the connection is closed immediately. Therefore, the local cache must be configured to continue with the download even when the connection is closed.

VTP (UDP) Transport Design

Overview of Operation

The following discussion describes the design of a UDP based VTP protocol of the type that may be used in connection with the practice of a preferred embodiment of the invention.

This protocol provides sequenced, reliable delivery of data as with TCP. It however employs a different rate control mechanism that better suite for environments with high bandwidth variation and packet loss rate. In addition this protocol also supports multiplexing several transport flows over a single flow controlled channel between two hosts. One of the main goals of this protocol is to perform better in those areas that TCP does not: high bandwidth, high delay, and/or high packet drops. Some of the drawbacks of TCP over wireless include its small initial send window, large maximum send window size, and very aggressive congestion control mechanisms.

This protocol provides reliable delivery of data as provided by TCP. It however employs a different rate control mechanism that is better suited for environments with high bandwidth variation and packet loss rate. In addition, this protocol also supports multiplexing multiple application data flows over a single channel between two hosts. This allows a greatly increased number of application conversation between two hosts without the side effect of reduced flow-control effectiveness experienced when employing a high number of TCP connections between them.

Connection Establishment

UDP is connectionless, datagram oriented protocol. In VTP, a logical connection must be established between the client and server for one or more of the following reasons:

to exchange sequence numbers that guarantee sequenced delivery;
to authenticate the client connecting at the server side;
to get any start up parameters from each end.

VTP connections between two hosts are setup before to any application level flow is setup. Once the VTP connection is established, an individual application conversation between two VTP-connected hosts requires no three-way hand-shaking. A VTP end-point redirecting mechanism allows TCP flows being redirected into this VTP tunnel without experience long setup delay.

VTP connection setup includes authentication and sequence number exchange to guarantee delivery of control packets and data packets from individual application flows (TCP flows).

A new connection is opened if there was no prior connection with the server. A connection open request is initiated from the client by sending a REQ_CONN (request connection) packet to the server. A connection request identifier is sent in every REQ_CONN packet to match REQ_CONN and REQ_ACK packets. The client should start a timer after it sends this packet. If the REQ_CONN timer goes off, send another REQ_CONN packet with a different connection request identifier. If no response is received from other side after sending some n (configurable parameter) number of REQ_CONN packets, the client gives up and reports "cannot establish connection" to the caller. After the client sends the REQ_CONN packet, it changes the status of that connection from closed (VTP_CLOSED) to "connection in progress" (VTP_REQ_CONN) state.

The server opens a socket and binds to some well known port for listening to client connect requests. Whenever the server gets a REQ_CONN packet, it should allocate a new real connection node and reply to REQ_CONN packet by sending REQ_CONN+ACK packet. At this point, the server moves that connection into "connection established" (VTP_EST) state. Once the client gets the REQ_CONN+ACK packet, it can move its real connection node into "connection established" state.

The client acknowledges the servers REQ_CONN+ACK packet with an ACK packet. Note that the client can deduce its round trip time to the server from REQ_CONN and REQ_CONN+ACK packets and the server can deduce round trip time between itself and this client from REQ_CONN+ACK and ACK packet from the client. Each end should get an RTT estimate as often as necessary to know the network.

If the real connection is opened successfully, data can be sent on a virtual connection by calling ta_send( ).

Data Flow and Explicit Rate Flow Control

One of the goals of any transport layer is to send data efficiently and to get the maximum throughput possible from the network. Once a connection is established, any of the intermediate routers between the sender and receiver might go down or some more new connections might be established that use one or more of links in the path. The sender should never send any data that leads to congestion in the network. The amount of data that the sender can send without getting any feedback from the receiver is called the "send window" and it is calculated as:

Send Window=(const1*bandwidth*delay)+(const2*$N$)

where:
bandwidth is the bottleneck link bandwidth (explained below)
delay is the round trip time between sender and receiver
const1 is an integer constant to correct bandwidth and delay estimations
const2 is an integer constant to account for dropped ACK packets
N is the maximum bytes received before sending ACK.

The throughput of a connection is limited by the amount of data the network can carry and the amount of buffer space the receiver has to store this data before it passes it up to the application layer. In the invention, receiver buffers are not regarded as a constraint. Because the network is the bottleneck now, the sender should never send any more data than the network can accept, taking into account buffers in intermediate routers and in the sending host. For example, a sender and receiver with 1 Mbps link are interconnected by a 128 kbps link. The throughput is now constrained by the 128 kbps (16 KBytes/s) link. If the sender has, e.g. 2 MB of data to send, it should not burst out all of these data quickly because they can get dropped at the intermediate router. To be exact, the sender should not send any more than ~16 KB in one second. This makes it clear that if the sender has knowledge of bandwidth of the bottleneck link in the path from itself to the receiver, it can regulate its sending rate so that no packets are dropped in between.

To continue the example in above paragraph, say the send window is 30 KB.

Because all the data are there to send, a complete send window worth of bytes can be sent at a time. This generates a burst of packets at the next router and, if there is no buffer space to hold these packets, they just end up getting dropped. To avoid this, because the sender knows the bandwidth it can send those bytes in a controlled way. This is the flow control aspect of transport. As long as the bandwidth available to this connection remains the same, the chances of dropping a packet are less. The send window is necessary to avoid network congestion and flow control is necessary to avoid bursts.

Once the sender sends its window's worth of bytes, it closes its window and it should wait for feedback from the receiver. Ideally, if the sender has data to send it should never stop sending it until all the data reaches other end i.e. the sender should never close its send window. The sender should open its send window again when it gets feedback from the receiver saying it got some or all of the data the sender has sent. Note that the sender should not free the data in its send window until it is positively acknowledged by the receiver. To keep the send window always open and have room for more data, the receiver should send its feedback as frequently as necessary.

It is clear that the knowledge of bandwidth and trip time for the transport to work efficiently. The following sections describe how VTP gets the bottleneck bandwidth and trip time.

Round Trip Time

Round trip time (RTT) is the time taken for a packet to reach the other end and to come back. This time includes queuing, transmission delays at the sender, queuing and processing delays at intermediate routers, and processing delay at the final host. Trip time (TT) is the time a packet takes from the sender to the receiver. VTP uses the following equation to deduce RTT:

RTT=(time from last packet sent to ACK received)−
(delay at receiver)−(sizeof(pkt)/bandwidth)

RTT is measured only when the sender releases one or more packets in response to a SACK, i.e. positively ACKed. It is not measured when SACK says the receiver did not receive anything because the second term in the equation needs a data packet.

The following example shows RTT computation:

| receiver | sender |
|---|---|
| | send 1 2 <----time t1 |
| | send 3 4 <----time t2 |
| | send 5 6 <----time t3 |
| t4---> 1 | |
| t5---> 3 | |
| t6---> 6 | |
| t7---> SACK says receiver got 1,3,6. | |
| | SACK arrives <-- time t8 |
| RTT@sender = (t8 − t3) − (t7 − t6) − (sizeof(pkt 6)/bandwidth). | |

RTT is used in computing the send window and is also used in estimating the retransmission timeout (explained later). The client transport, which initiated the connection (real), can get RTT at connection setup with REQ_CONN and REQ_CONN+ACK packets. The server can deduce its RTT to the client if it gets the client's ACK packet. If the client's ACK packet is dropped, the server has to derive RTT using above equation from the first SACK from the receiver. This requires the sender to time stamp each packet sent. The SACK packet should carry time difference from its last data packet to this SACK.

Send Window Close Timeout (WTO)

As mentioned earlier, the sender should stop after sending the last data packet that it got from the application layer or after it sends a full window's worth of bytes. It is up to the sender to guarantee that each and every byte sent by the application layer is delivered to the receiver in sequence and without any error. The receiver sends feedback about the packets it received and packets that are not. If the feedback about received packets is dropped, the sender should have some way to know about the packets received at the receiver. To ensure that the receiver is getting the packets it is sending, after sending the last packet it should start a timer that expires in some time. This timeout is called last packet ACK timeout (LTO). If the sender does not get any feedback within LTO time, it sends a "requesting sack" packet to make the receiver send a feedback (when to send feedback is explained in SACK). The LTO timer should be set such that it does not expire too early or too late. It should not expire too early for two reasons: Feedback may already be on the way to the sender; Too early timeouts cause too many retransmits. It should not expire too late for the reason that the pipe is not carrying any packets from this connection anymore. The LTO equation is given below:

$$LTO = K5*(RTT + bytes\_sent/bandwidth)$$

where:
K5—integer constant to adjust delay
RTT—sender's RTT
bytes_sent—total number of bytes sent
bandwidth—transmit rate.

When the sender has sent a full send window's worth of bytes, it has to stop sending any new packets. The transport layer should make sure that this never happens when it has more data to send in virtual connection queues. The fact that the send window is closed and the sender is not sending any packets implies that the sender is not using the pipe to its fullest. The SACKs, acknowledging the packets received enable the sender to release ACKed bytes from its send window, thereby providing room for new bytes to be sent.

The sender starts "send window close timer" whenever it has to stop after sending full send window. The send window close timer (WTO) is given as:

$$WTO = 2^M * Const * RTT$$

where:
M—maximum number of retries
Const—an integer constant
RTT—sender RTT to client.

When WTO expires, the sender should send a new packet called SEND_SACK requesting the receiver to send its SACK. The sender tries sending these SEND_SACK packets up to some configured number of times (M). If it does not get any feedback after the last SEND_SACK packet, the sender should close all the virtual connections on that real connection, discard any packets in real connection out bound queue, and release the real connection.

If the network does not drop any packet, there might never be a timeout on the WTO timer.

Bandwidth

Bandwidth of a path is the time it takes to transmit some number of bytes from the sender to the receiver. This time includes transmission time of the device plus propagation time of the link(s) in between. A link is the medium, wire or wireless, between two hosts. VTP measures the bandwidth of the path by sending two packets, one after another, with no time difference at the sender. Depending on the bandwidth of the links they traverse, they both arrive with some time difference at the receiver. The arrival time is the time when the receiver gets the packet(s) out of UDP socket buffers via recvfrom( ) system call. Note that on high speed links, e.g. 4 Mbps, two or more packets can arrive with zero time difference. The following shows how one can get the bandwidth by sending two packets of size 1 KB each on a 4 KB/s link.

$c11$ is packet 1 from connection 1, $c12$ is packet 2 from connection 1 and $c21$ is packet from connection 2.

$$bandwidth = (c12\ arrivaltime - c11\ arrival\ time)/c12\ packet\ size$$

Ignoring propagation delays, it takes 0.25 seconds for a 1 KB packet to traverse a 4 KB/s link.

CASE1:
sender | c12 | c11 |     receiver  bw = (0.5 − 0.25)/1 KB = 4
CASE2:
sender | c21 | c12 | c11 |     receiver  bw = (0.5 − 0.25)/1 KB = 4
CASE3:
sender | c12 | c21 | c11 |     receiver  bw = (0.75 − 0.25)/1 KB = 2
CASE4:
sender | c12 | c22 | c21 | c11 |     receiver  bw = (1 − 0.25)/1 KB = 1.33

In CASE1, connection1 is the only connection using the link, so it gets complete bandwidth, and that is what the transport sees. In CASES 2, 3, and 4, a new connection c2 is also using the same link. At this time, ideally, receiving transport for connection1 should detect a bandwidth of 2 KB/s. But, as shown above, this can fluctuate anywhere from 1.33 KB/s to 4 KB/s depending upon how the packets of connection 1 gets spaced. VTP arrives closely at 2 KB/s by averaging the bandwidth continuously. The receiving transport should intimate its current receive rate via SACK.

If the time difference between two packets in sequence is zero, VTP measures that as default maximum bandwidth.

Selective Acknowledgment (SACK)

SACK is the feedback from the receiver. A receiver should send feedback about the data it received as frequently as it can for several reasons:
to keep the send window open at sender side
to let the sender know about the packets lost and received
to let the sender know about receiver's current receive rate.
A SACK should be sent only when necessary.

Processing ACKnowledgement

The receiver sends an acknowledgement in the following cases:
1. When RTO expires
2. When it receives 16 KB or 32 packets in sequence
3. Any pending ACK can be piggybacked with data packet
4. First out of sequence packet
5. Substantial change of bandwidth.

The first three ACKs contain information about lost/received data packets; the last two could be sent even if no new data packets are received by the receiver. Upon receiving an ACK that has lost/received information, the sender should immediately free up the VBufs that are ACKed. If the incoming ACK positively acknowledges everything in out_queue, i.e. sent-but-unacked, and if sender had something to send, it should clear the 'next transmit timer' and send the new data because the pipe is clearly empty.

(Re)Transmission Policy

The sender can send a new packet if it fits in the current send window. Otherwise, the sender should leave the packet in the virtual connection's out bound queue and transmit them when send window is opened by the next SACK. Whenever the sender transmits a new packet, it should start a fresh timer that should expire at LTO time. LTO time includes the transmit time plus trip time. When this timer expires, the sender sends a REQUEST_SACK packet and restarts the timer. If the sender does not get any reply from the receiver after sending N (configurable) number of REQUEST_SACK packets, the sender must close the connection with the receiver. The sender should never retransmit until it thinks the packet it sent should be out of network based on current bandwidth and latency. If a retransmit request is received within this flight time, the sender ignores the retransmit request.

The sender should never send its full send window worth of bytes at once. This might lead to a burst of packets at the next or intermediate router and may cause packet drops if there are insufficient buffers. To avoid this, the sender must always control the flow of packets by time, spacing them according to the bandwidth and delay of the path.

Connection Termination

The application layer may terminate a virtual connection at any time. The transport layer should send a connection close packet with the type of close, i.e. abort or graceful close. transport layer should drop any packets going from this virtual connection towards other end and send a new packet (just the header is sufficient) of type TP_ABORT if the application is aborting its connection. Otherwise, it should send all the packets and then close the VC. In the latter case, it sets the TP_CLOSE bit in the last outgoing packet of VC to convey that VC at this is closed. Once a virtual connection is closed, no data are sent or received on that connection. The receiving transport layer informs the application layer that the other side has requested connection closure. Note that the real connection is never closed. A real connection is closed only when one end of the connection dies.

Checksum Computation

The transport should guarantee that data are delivered to the other end without any errors. To detect bit errors in transmission, a checksum is computed over the entire packet before delivering the datagram to the receiver. The receiver should recompute the checksum for the packet arrived and compare it the checksum in the packet. If the checksum differs, consider that as a corrupted packet and discard it. The checksum field in the header must be taken as zero before computing the checksum. To compute the checksum, divide all the data into 16-bit quantities and compute the one's complement of their one's complement sum. This is similar to checksum computation in the Internet.

Authentication

Authenticity of the client and/or server can be verified by authentication module once the real connection is established at the transport layer, but before any data are transmitted between each end. Note that a real connection may not be established depending upon authentication parameters. For example, a real connection is denied at transport level if the server desires to authenticate a client but the client has authentication disabled or client cannot support authentication.

Security

Security is provided in the transport to avoid any malicious hacker sending a packet that looks like a packet that is sent by the system. One way one could disrupt the real connection is by sending a bogus packet that is in sequence with an authentic packet sent by the client/server. The goal of the security in VTP is not to leave any holes for such man in the middle attacks. To avoid this, each end sends a pseudo-random sequence number (PRSN) that can be decoded only by the peer entities involved.

A client can enable security at the transport level from UI. If the transport is not configured to be secure, it uses serial sequence numbers for data transmission and the ACK process.

Although the invention is described herein with reference to the preferred embodiment, one skilled in the art will readily appreciate that other applications may be substituted for those set forth herein without departing from the spirit and scope of the present invention. For example, the pre-fetch mechanism could perform a selective pre-fetch of any selected objects, not just those that are sequentially loaded. The pre-fetch mechanism could apply various heuristics, rules, or adaptive behavior to determine which objects are to be pre-fetched selectively. Further, Web pages could include metatags that are interpreted by the pre-fetch mechanism and that determine which objects are to be selectively pre-fetched.

Accordingly, the invention should only be limited by the Claims included below.

The invention claimed is:

1. An apparatus comprising:
an agent operatively coupled with a source server via a browser and a resource-constrained communications link;
a fetching mechanism configured for selectively pre-fetching page objects from said source server and for downloading page objects in a substantially parallel fashion from said source server to said browser via said communications link;
a cache operatively coupled with said browser that caches said pre-fetched page objects and caches page objects that are downloaded by said mechanism;
a parsing element operatively coupled with said browser configured for identifying one or more page objects that are fetched sequentially according to routine browser operation;
wherein said agent is configured for enhancing said routine browser operation by invoking said fetching mechanism to pre-fetch, in a substantially parallel fashion, one or more page objects that are identified as sequentially fetched according to routine browser operation, making said pre-fetched page objects available to said browser by said agent before they would be if sequentially fetched according to routine browser operation.

2. The apparatus of claim 1, wherein said fetching mechanism is configured for communicating with a corresponding server mechanism, and configured for readying necessary page objects to be available to said browser.

3. The apparatus of claim 1, wherein said agent further comprises an additional mechanism that assists said browser in fetching page objects by coordinating fetching of selective page objects;
wherein selected page objects are available to said browser; and
wherein said browser does not need to wait for a request and a corresponding response to traverse resource constrained links in said communications link before an object is available.

4. A method for displaying pages that are comprised of a plurality of page objects, fetched over one or more communications links, said method comprising the steps of:

operatively coupling a parsing element with a browser, wherein said parsing element is configured for identifying one or more page objects that are fetched sequentially according to routine browser operation;

operatively coupling an agent with a source server via said browser and a resource-constrained communications link;

operatively coupling a fetching mechanism with said agent;

selectively pre-fetching, using said fetching mechanism, said page objects in a substantially parallel fashion from said source server to said browser via said communications link;

caching said pre-fetched page objects in a cache operatively coupled with said browser;

wherein step of pre-fetching allows page objects available to be available at said browser before they would be if sequentially fetched according to routine browser operation.

5. The method of claim 4, wherein said step of selectively pre-fetching further comprises the steps of communicating with said source server, and readying necessary page objects to be available to said browser.

6. The method of claim 4, further comprising:

assisting, using said agent, said browser in fetching page objects by coordinating fetching of selective page objects;

wherein selected page objects are available to said browser; and wherein said browser does not need to wait for a request and a corresponding response to traverse a resource constrained link before an object is available.

7. An apparatus comprising:

a gateway operatively coupled with a source server via a browser and a resource-constrained communications link;

a fetching mechanism configured for selectively pre-fetching page objects from said source server and for downloading page objects in a substantially parallel fashion from said source server to said browser via said communications link;

a cache operatively coupled with said browser that caches said pre-fetched page objects and caches page objects that are downloaded by said mechanism;

a parsing element operatively coupled with said browser configured for identifying one or more page objects that are fetched sequentially according to routine browser operation;

wherein said gateway is configured for enhancing said routine browser operation by invoking said fetching mechanism to pre-fetch, in a substantially parallel fashion, one or more page objects that are identified as sequentially fetched according to routine browser operation, making said pre-fetched page objects available to said browser by said agent before they would be if sequentially fetched according to routine browser operation.

8. The apparatus of claim 7, wherein said fetching mechanism is configured for communicating with a corresponding server mechanism, and configured for readying necessary page objects to be available to said browser.

9. The apparatus of claim 7, wherein said gateway further comprises an additional mechanism that assists said browser in fetching page objects by coordinating fetching of selective page objects;

wherein selected page objects are available to said browser; and wherein said browser does not need to wait for a request and a corresponding response to traverse a resource constrained link in said communications link before an object is available.

10. A method for displaying pages that are comprised of a plurality of page objects, fetched over one or more communications links, said method comprising the steps of:

operatively coupling a parsing element with a browser, wherein said parsing element is configured for identifying one or more page objects that are fetched sequentially according to routine browser operation;

operatively coupling a gateway with a source server via said browser and a resource-constrained communications link;

operatively coupling a fetching mechanism with said gateway;

selectively pre-fetching, using said fetching mechanism, said page objects in a substantially parallel fashion from said source server to said browser via said communications link;

caching said pre-fetched page objects in a cache operatively coupled with said browser;

wherein step of pre-fetching allows page objects available to be available at said browser before they would be if sequentially fetched according to routine browser operation.

11. The method of claim 10, wherein said step of selectively pre-fetching further comprises the steps of communicating with said source server, and readying necessary page objects to be available to said browser.

12. The method of claim 10, further comprising:

assisting, using said gateway, said browser in fetching page objects by coordinating fetching of selective page objects;

wherein selected page objects are available to said browser; and wherein said browser does not need to wait for a request and a corresponding response to traverse a resource constrained link before an object is available.

13. An apparatus comprising:

a reader configured for reading web page description language received via a browser, identifying the presence of one or more meta-tags contained with a web page description, and interpreting said meta-tags as identifying one or more page objects within said web page that are fetched sequentially according to routine browser operation;

a fetching mechanism configured for selectively pre-fetching page objects from said source server and for downloading page objects in a substantially parallel fashion from said source server to said browser via said communications link when said reader identifies said one or more page objects;

a cache operatively coupled with said browser that caches said pre-fetched page objects and caches page objects that are downloaded by said mechanism;

wherein said reader is configured for enhancing said routine browser operation by making said pre-fetched page objects available to said browser before they would be if sequentially fetched according to routine browser operation.

14. The apparatus of claim 13, wherein said fetching mechanism is configured for communicating with a corresponding server mechanism, and configured for readying necessary page objects to be available to said browser.

15. The apparatus of claim 13, wherein said agent further comprises an additional mechanism that assists said browser in fetching page objects by coordinating fetching of selective page objects;
   wherein selected page objects are available to said browser; and
   wherein said browser does not need to wait for a request and a corresponding response to traverse a resource constrained link in said communications link before an object is available.

16. A method for displaying pages that are comprised of a plurality of page objects, fetched over one or more communications links, said method comprising the steps of:
   receiving a plurality of streams of web page description language via a browser;
   reading said plurality of streams using a reader;
   identifying, using said reader, the presence of one or more meta-tags contained with a web page description;
   interpreting said meta-tags as identifying one or more page objects within said web page that are fetched sequentially according to routine browser operation;
   operatively coupling a fetching mechanism with said browser;
   selectively pre-fetching, using said fetching mechanism, said one or more page objects in a substantially parallel fashion from said source server to said browser via said communications link;
   caching said pre-fetched page objects in a cache operatively coupled with said browser;
   wherein step of pre-fetching allows page objects available to be available at said browser before they would be if sequentially fetched according to routine browser operation.

17. The method of claim 16, wherein said step of selectively pre-fetching further comprises the steps of communicating with said source server, and readying necessary page objects to be available to said browser.

18. The method of claim 16, further comprising:
   assisting said browser in fetching page objects by coordinating fetching of selective page objects;
   wherein selected page objects are available to said browser; and
   wherein said browser does not need to wait for a request and a corresponding response to traverse a resource constrained link before an object is available.

* * * * *